United States Patent [19]

Attridge

[11] 4,329,715
[45] May 11, 1982

[54] APPARATUS FOR USE IN SCANNING A CINEMATOGRAPH FILM

[75] Inventor: Stephen P. Attridge, London, England

[73] Assignee: Transcan Video Limited, London, England

[21] Appl. No.: 194,319

[22] Filed: Oct. 6, 1980

[51] Int. Cl.³ .............................................. H04N 3/36
[52] U.S. Cl. ..................................... 358/214; 358/216
[58] Field of Search ........................ 358/214, 215, 216

[56] References Cited

U.S. PATENT DOCUMENTS 3,604,850 9/1971 Eckenbrecht et al. ......... 358/216 X
4,205,337 5/1980 Millward ................................ 358/54

Primary Examiner—Robert L. Richardson
Attorney, Agent, or Firm—Robert F. O'Connell

[57] ABSTRACT

In a flying spot film scanner for scanning a cinematograph film frame by frame during continuous movement of the film and producing a television video signal, apparatus is provided which processes signals representative of the direction of film movement, rate of film movement, position of each film frame in a film gate, times for television fields to begin, and rate of vertical deflection in a raster suitable for scanning a stationary film frame, to produce a composite output signal suitable for effecting the vertical deflection and positioning of a raster intended to scan a frame of a film moving so as to give rise to such signals. The required processing is effected by using an up/down position counter in which the number represents the current position of a reference point in whichever film frame is entering a scanning region defined by the film gate, and a composite counter in which the counting is started at the beginning of each television field from the loading in of the current number in the position counter and is effected from this number by clock pulses, some of which are representative of the rate of vertical deflection in a raster suitable for scanning a stationary film frame, and others representative of the rate of movement of the film.

3 Claims, 12 Drawing Figures

FIG 4
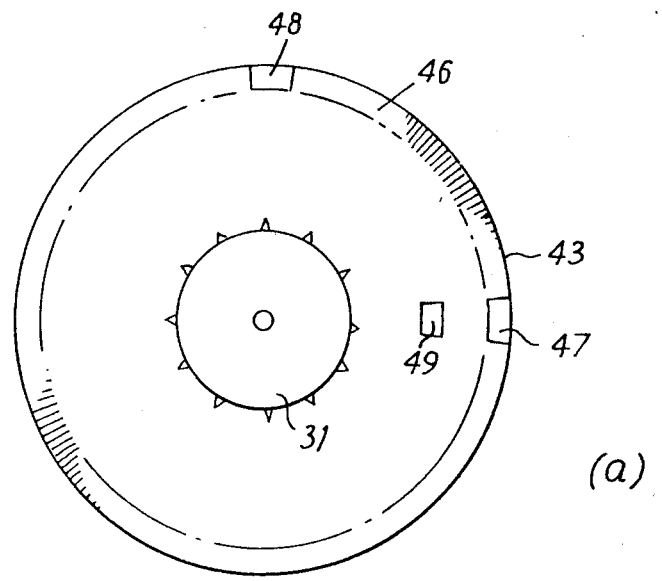
(a)
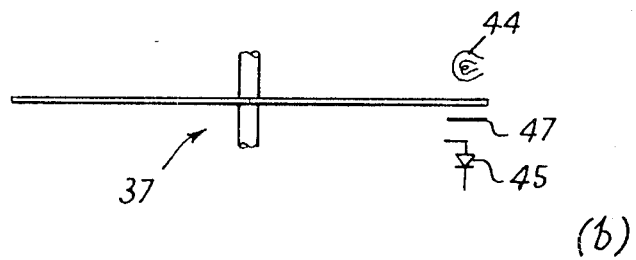
(b)

APPARATUS FOR USE IN SCANNING A CINEMATOGRAPH FILM

BACKGROUND OF THE INVENTION

This invention relates to apparatus for use in scanning a cinematograph film from which a television video signal is to be produced while the film is being moved in a continuous manner.

The principal problem which such apparatus must cope with is the difference between the rate at which conventional cinematograph film must be viewed in order to give a reproduction of the appearance of the recorded scene which is true with regard to movement in the original scene, and the conventional rate of formation of television pictures. For example, many cinematograph films are intended to be projected at 24 frames per second, and in the European PAL system of colour television, 50 television fields consisting of 25 pairs of interlaced rasters are formed each second. It is well known to run such a film at 25 frames per second, since at this rate there is substantially no noticeable unnaturalness about movement in a reproduced scene, and to scan each film frame picture twice. The pair of rasters which can each frame picture in this method are displaced from one another, the second of the pair being displaced from the first in the direction of movement of the film. Furthermore, for a conventional cinematograph film in which the intended horizontal dimension of each film frame picture is transverse to the length of the film, the vertical dimension of each raster is compressed in proportion to forward film speed and expanded in proportion to reverse film speed.

The conventional measures adopted to allow for these effects of the film movement on the vertical extent needed for each raster and the vertical positioning of the raster are to generate a basic vertical deflection signal in the form of a regular sawtooth with a repetition rate equal to the field frequency of the television system, e.g. 50 hertz for PAL, and a slope which would give the required vertical deflection of a cathode ray tube generated raster pattern for projection onto a stationary frame picture of the film, and to superpose this basic signal on a compensation signal which is derived by sensing the film speed and direction and the position of film frames as they enter a scanning region. In a co-pending patent application entitled "Apparatus for use in scanning a cinematograph film", by Andrew S. Armstrong and Martin R. Sach, there is described apparatus for use in scanning a cinematograph film from which a television video signal is to be produced while the film is being moved in a continuous manner in a film transport, the apparatus including movement signal generating means responsive to movement of a cinematograph film in the transport to produce a signal indicative of direction of movement of the film and a position signal having a value representative of the position of a predetermined point along the length of each film frame during the time in which the said point moves from a reference position in a film scanning region to a position reached when the predetermined point of the next film frame entering the scanning region arrives at the reference point. Raster reference means produce a raster reference signal having a value representative of the rate of increase of the vertical coordinate of a scanning raster of the dimensions required for scanning a frame of the film in the absence of movement of the film. Signal combining means are coupled to the movement signal generating means and to the raster reference means and adapted to sample the value of the position signal substantially at each time at which a scanning raster is to be initiated by an electro-optical raster source when coupled to a raster output of the combining means. The combining means are supplied by the movement signal generating means with the signal indicative of direction of movement and with a signal representative of rate of movement of the film and produce at the raster output in each interval beginning substantially at the time of a respective sampled value of the position signal and ending substantially at the time of the next sampled value thereof an output signal having a value substantially representing the said vertical coordinate of the scanning raster required for scanning a frame of the film during the said interval, the said vertical coordinate being parallel to the length of the film at least at the scanning region. In the apparatus specifically described therein, the movement sensing means is such that the said signal representative of rate of movement of the film varies with the length of film passing through the scanning region in a unit of time, and includes means for generating a reference train of pulses having a repetition rate which varies with but is not greater than the frame rate of the film. The reference train of pulses is generated having a repetition rate which is an integral submultiple of the frame rate of the film and is utilized in the production of a further reference train of pulses with a repetition rate equal to the frame rate. In this particular apparatus, the movement signal generating means includes an up/down counter arranged to be so reset by each pulse of the further reference train that the count in this counter at the start of each counting cycle is representative of the said reference position, the said signal representative of rate of movement of the film being supplied as clock signal to the said up/down counter, and the signal indicative of direction of movement being so supplied to the said up/down counter as to determined in direction of counting thereof in dependence upon the direction of movement of the film, whereby the count in the said up/down counter is representative of the position of the predetermined point of each film frame during the said time in which the said point moves from the reference position to the other said position.

For producing the said signal indicative of direction of movement of the film, the movement signal means includes means for generating two trains of pulses having equal repetition rates and a phase displacement relative to one another which changes only with change in the direction of movement of the film. The equal repetition rates of the said two trains are equal to an integral multiple of the frame rate of the film, and the movement signal generating means includes a pulse rate dividing counter adapted to divide the rate of one of the said two trains of pulses and to thereby produce the said further reference train of pulses, the dividing counter being arranged to be reset by each pulse of the first said reference train of pulses. The two trains of pulses having equal repetition rates are applied to a bistable circuit such that the state of the bistable circuit changes in response to a change in the relative phase displacement of the said two trains.

For use in so producing the said signal representative of rate of movement of the film that the said signal varies with the length of film passing through the scanning region in a unit of time, the movement signal generating means includes a pulse generator arranged to generate pulses at a rate dependent upon the rate of rotation of a capstan drawing film through the said scanning region.

Furthermore, the signal combining means includes an up/down counter adapted to load in the count in the up/down counter of the movement signal generating means substantially at each time at which a scanning raster is to be initiated and to count from the count thus loaded therein a plurality of clock pulses produced in the signal combining means in response to the said signal representative of rate of movement, and a plurality of clock pulses produced in the signal combining means in response to the said raster reference signal, the direction of counting of the clock pulses produced in response to the said signal representative of rate of movement being carried out in a direction determined by the signal indicative of direction of movement of the film and the direction of counting of the clock pulses produced in response to the said raster reference signal being arranged to correspond to the direction required for producing output signal values representative of the increasing vertical coordinate of a scanning raster for scanning a frame of the film in the absence of movement of the film.

The use of the respective said up/down counters in the movement signal generating means and the signal combining means with their respective directions of counting determined directly by the signal indicative of direction of film movement alone or in combination with a further, intermittent signal indicative of the direction for producing the increasing vertical coordinate of a scanning raster in the absence of film movement results in considerable complexity in ancillary circuitry for ensuring that the times of occurrence of the various clock and resetting signals do not result in mutual interference and the generation of spurious signals.

It is accordingly an object of the present invention to provide apparatus for use in scanning a cinematograph film in which the risk of mutual interference between signals is reduced and the ancillary circuitry is simpler.

SUMMARY OF THE INVENTION

According to the present invention, apparatus for use in scanning a cinematograph film from which a television video signal is to be produced while the film is being moved in a continuous manner is provided in which first and second up/down counters are used each of which has a separate input for clock pulses to be counted up and a separate input for clock pulses to be counted down. Steering logic controlled by a signal indicative of film movement direction is used to channel clock pulses selectively to one or the other of the clock pulse inputs of these counters. The apparatus also includes a film transport for effecting continuous movement of cinematograph film, and means defining a film scanning region. Signal generating means generate pulses representative of the rate of movement of the film and signals representative of the direction of movement of the film and of arrival of a predetermined point along the length of each film frame at a reference point in the film scanning region. A raster reference signal having a repetition rate representative of the rate of increase of the vertical coordinate of the scanning raster required for a stationary film frame is produced and supplied to the second up/down counter. The signal generating means supplies a resetting signal at each occurrence of the arrival of a predetermined point along the length of each film frame at the reference point in the film scanning region to a reset input of the first up/down counter which in response thereto resets to a reference count value representative of the position of the reference point in the film scanning region. Thus during each counting cycle of the first up/down counter, the count therein is representative of the position of the predetermined point of a respective film frame in the scanning region, the clock pulses channelled to the first counter by the steering means being pulses representative of the rate of movement of the film from the signal generating means. Raster start means supply resetting signals indicative of times at which a scanning raster is to be initiated to the second up/down counter which is so coupled to the first counter as to reset to the current count value in the first counter at each start signal. Since the second counter counts the raster reference signal and the clock pulses supplied through the steering logic, the count value in the second counter is representative of the vertical coordinate of the scanning raster required for scanning the moving film frame in the scanning region. A converter coupled to the second counter produces an analog signal which is representative of the count value in the second counter and can be supplied to vertical scanning circuitry.

Other features and objects of the invention will be better understood from the following detailed description of a preferred embodiment which is given by way of example and is illustrated in the accompanying drawings.

BRIEF DESCRIPTION OF THE DRAWINGS

FIGS. 4A–B is pair of schematic views of a signal generating device included in the embodiment of FIG. 3.

DETAILED DESCRIPTION OF THE PREFERRED EMBODIMENT

Figure 1:
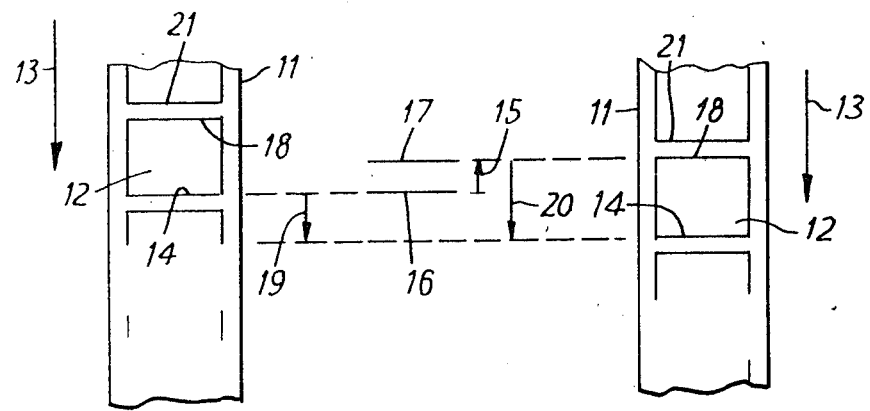
FIG. 1 is a schematic representation of forward movement of a film frame in a scanning region.

FIG. 1 shows a piece of a film 11 being scanned, the left hand side of FIG. 1 showing the position of the film at the beginning of a scanning raster on a film frame 12, and the right hand side showing the position of the film at the end of the same raster. The film 11 in FIG. 1 is moving in its forward direction which is downwards in FIG. 1 as indicated by arrows 13, and the top line of each picture constituting a frame of the film 11 is lowermost in FIG. 1 and serves as the leading edge of the respective frame. In FIG. 1, the rate of movement of the film 11 is twenty-five frames per second and the rate of raster generation is fifty fields per second, so that the picture of each film frame can be scanned twice, the two rasters being interlaced as is conventional in PAL and NTSC television scanning.

Since each raster starts at the top line of a film picture and ends at the bottom of that picture, the distance, measured parallel to the movement of the corresponding film frame, between the first and last lines of each raster is, in the example of FIG. 1, slightly less than half the length of a film frame, i.e. half the distance separating two successive leading edges of film frames. This short distance is illustrated in FIG. 1 by an arrow 15 whose direction indicates the direction of vertical progression in the raster and whose length is the distance between a broken horizontal line 16 aligned with the initial position of the top line 14 of the picture of the frame 12 and a broken horizontal line 17 aligned with the final position of the bottom line 18 of the picture of the frame 12. The distance moved forward by the leading edge of the frame 12 is indicated by an arrow 19 and the distance which the scanning spot must leap in order to be in the correct position to begin the next raster, i.e. at the leading edge of the frame 12 after the first raster, is indicated by an arrow 20. During the subsequent fiftieth of a second the scanning spot carries out a second raster which ends at a level slightly below that of the line 16 and then jumps back to the level of the line 16 at which the top line 21 of the picture of the next frame after the frame 12 is now present.

Figure 2:
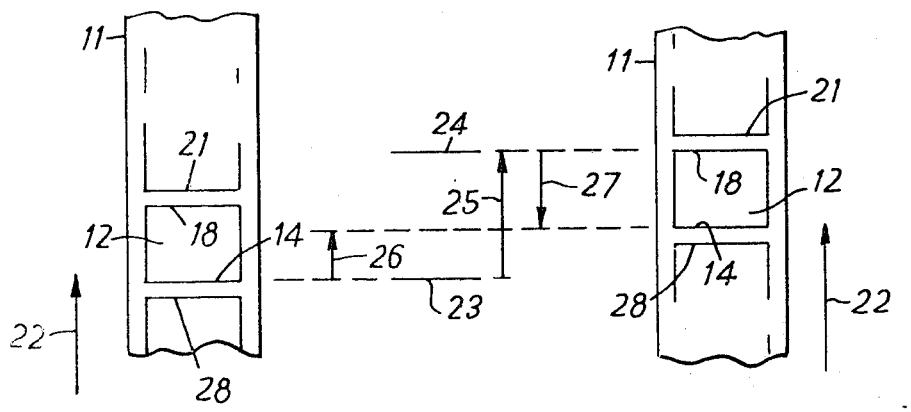
FIG. 2 is a schematic representation of reverse movement of a film frame in a scanning region.

FIG. 2 illustrates the same piece of the film 11 running in reverse at twenty-five frames per second, the direction of the movement of the film 11 being indicated by arrows 22. In this example the bottom line 18 of the picture of the frame 12 is the leading edge of the frame. Each raster must still start at the top line of a film picture and therefore the first raster scanning the frame 12 starts at the level, indicated by broken line 23 in FIG. 3, of the top line 14 of the picture of the frame 12. During the time occupied by the first raster, the film 11 moves nearly half a frame in reverse, so that the position of the bottom line 18 of the frame 12 is as shown at the right hand side of FIG. 2 and the first raster ends at the level of a broken horizontal line 24 aligned with the bottom line 18. Consequently the vertical extent of the first raster is represented by an arrow 25 reaching from the line 23 to the line 24. The top line 14 of the picture of the frame 12 is then almost half a frame beyond its starting position, in the direction of the arrows 22. The scanning spot therefore jumps back almost to a level aligned with the right hand position of the top line 14 to begin the second raster. The distance travelled in reverse during the first raster by the top line 14 is indicated by an arrow 26, and the distance jumped by the scanning spot from the end of the first raster to the beginning to the second raster is indicated by an arrow 27. Shortly after the end of the second raster the bottom line 28 of the next frame after the frame 12 in the reverse direction reaches the position which the bottom line 18 occupied at the beginning of the first raster and its top line reaches the former position of the top line 14.

It will be seen that the vertical extent of each raster depends on the speed of movement of the film and on the direction of this movement. It will also be seen that the jump in the position of the scanning spot from the end of one raster to the beginning of another when scanning the same film frame picture has the vertical extent of approximately the distance between the bottom and top edges of the picture the jump being more by the distance travelled forwards by the film in the time that the scanning spot is blanked between rasters, or being less by the distance travelled in reverse by the film in that time, depending on the direction of movement of the film. Furthermore, it will be seen that the jump required from the end of the last raster scanning one frame to the beginning of the first raster scanning the next frame has the vertical extent of approximately the bottom line of the picture of the leading frame to the top line of the picture of the following frame, being for forward film movement less than the width of one horizontal border separating two film pictures by the distance travelled by the film in the time during which the scanning spot is blanked, and for reverse film movement is less than the length of two frames less one horizontal border width by the distance travelled by the film in the time during which the scanning spot is blanked.

If the film rate is twenty-four frames per second and the raster generation rate is sixty fields per second, as for NTSC in the United States of America, successive pictures of the film 11 must be scanned alternately twice and three times. In each picture scanned twice, the relative positioning is similar to that described hereinbefore with reference to FIGS. 1 and 2. For each picture scanned three times, there are two jumps between rasters, each jump corresponding substantially to the jumps represented by the arrows 20 and 27, but the second jump being displaced in the direction of film movement by a distance proportional to the rate of the film movement, and a final jump which for forward film movement is again approximately the width of the horizontal border between the adjacent film pictures, and for reverse film movement is again approximately the length of two frames less one horizontal border width. It will also be seen that the beginning of the third raster when a film picture is being scanned three times occurs before the top line of the picture has moved the length of one frame. Consequently, the starting points for every raster can be known if the position of the top line of the picture in each frame is known throughout the time taken for that top line to move the length of one frame past a reference point. This consequence is true for all speeds of film movement forwards or in reverse. However, if the speed in film frames per second exceeds the rate of raster generation in rasters per second, not all of the film pictures can be scanned since to scan every film picture with the film moving faster than the rate of raster generation would require the positions of successive rasters to be continually displaced further in the direction of the film movement. Furthermore, if the time over which rasters are started on each film frame is allowed to be longer than the time taken for the top edge of the picture of the film frame to move through the length of one frame, successive pictures would again require the positions of successive rasters to be continually displaced further in the direction of the film movement.

Figure 3:
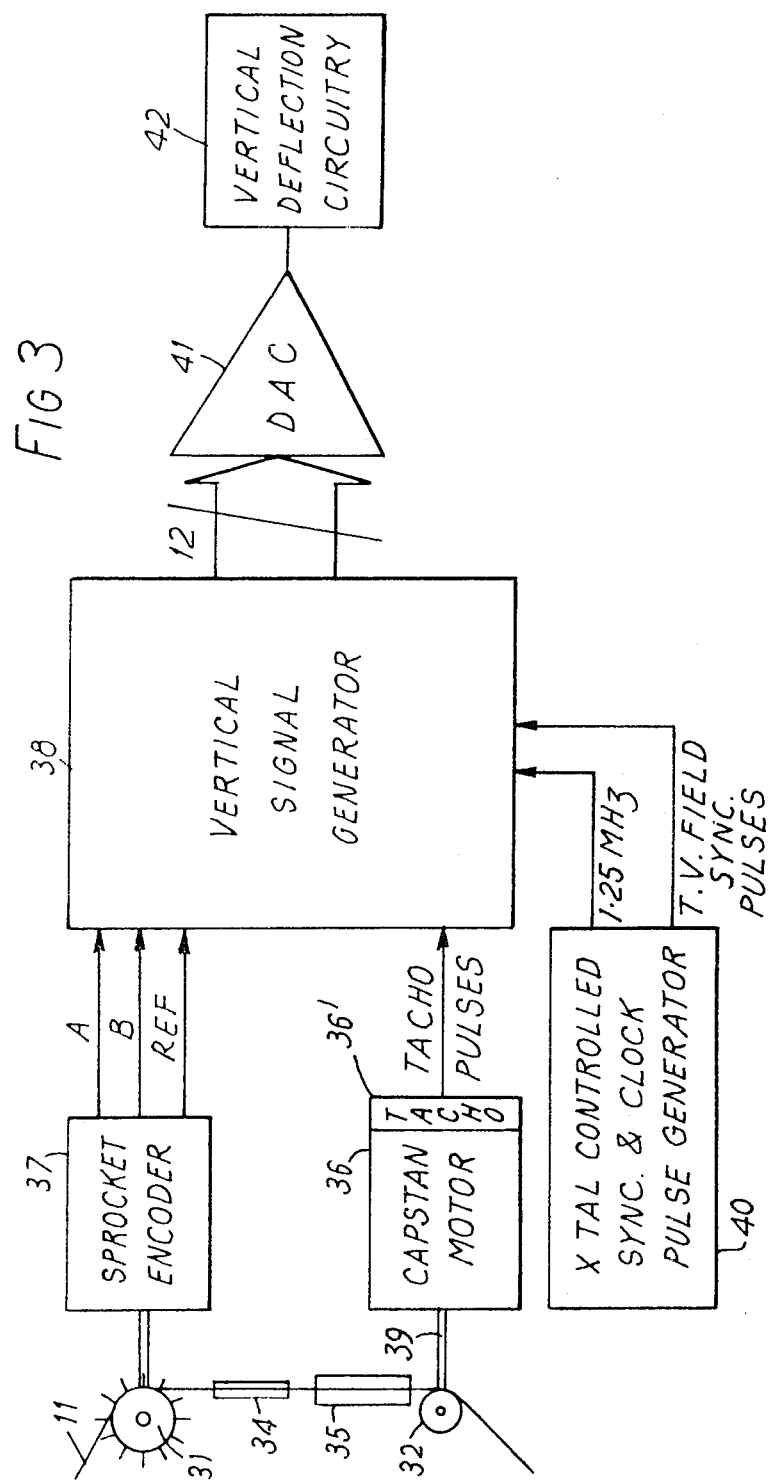
FIG. 3 is a block diagram of apparatus embodying the invention.
Figure 5:
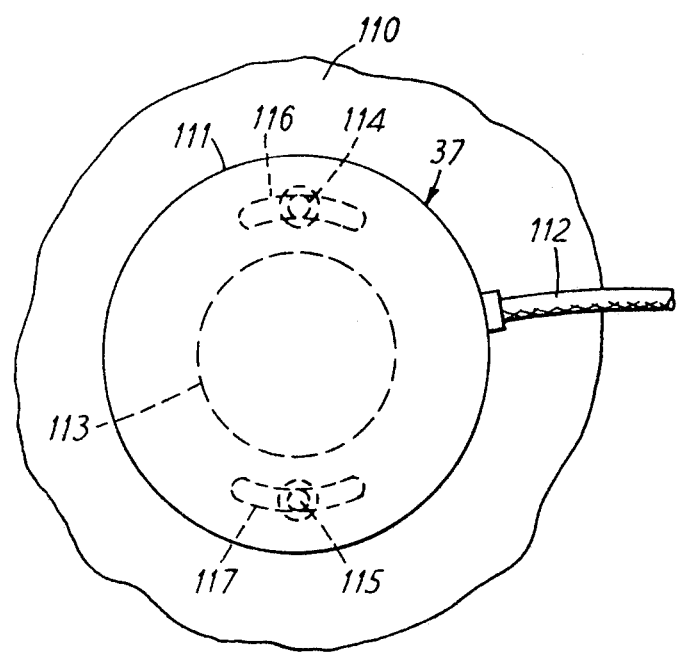
FIG. 5 is a side view illustrating adjustable mounting of a signal generating unit.

FIG. 3 shows in block form an apparatus embodying the present invention and engaging a portion of a film 11 by means of a twelve tooth sprocket 31 and a capstan 32. Between the sprocket 31 and the capstan 32 the film 11 passes through a film gate 34 and a sound head unit 35. In forward film motion, the film 11 passes from the sprocket 31 to the capstan 32. The apparatus of FIG. 3 forms part of a continuous motion flying spot film scanner in which a cathode ray tube (not shown) is used to produce a raster an image of which is projected by a suitable optical system (not shown) onto a film frame in the gate 34. The film 11 is, in forward motion, unwound from a supply spool (not shown) and wound onto a take-up spool (not shown). The capstan 32 is driven at a steady speed, for normal forward motion of the film 11 by a capstan motor 36. Film transport systems for continuous motion flying spot scanners are well known and will not be further described herein.

The sprocket 31 is equipped with a sprocket encoder 37 which, in operation, produces three output signals, two rectangular waveforms A and B which are in quadrature, and a stream of widely spaced reference pulses REF. These three output signals are supplied to a vertical signal generator 38 which also receives a train of pulses TACHO PULSES from a tachometer unit 36' driven by the output shaft 39 of the capstan motor 36. In one example the tachometer unit 36' generates pulses at the rate of 20.8 kilohertz when the film is moving at 25 frames per second. The vertical signal generator 38 receives also a stream of clock pulses at 1.25 megahertz and television field sync pulses, both from a crystal controlled synchronising and clock pulse generator 40.

The vertical signal generator 38 uses the six inputs A, B, REF, TACHO PULSES, 1.25 MHz and TV FIELD SYNC PULSES to produce an eleven bit digital output signal the value of which at any time determines the vertical position of the scanning spot of the cathode ray tube (not shown) mentioned hereinbefore, the eleven bit digital output signal being converted to an analog signal by a digital to analog converter 41 and the resultant analog signal being supplied to vertical deflection circuitry 42 of the cathode ray tube (not shown).

The sprocket 31 and its encoder 37 are shown, somewhat schematically, in FIG. 4 where at (a) an encoder disc 43 is shown mounted coaxially with the sprocket 31, and separating light sources such as a source 44 from light resources such as a photodetecting diode 45.

The disc 43 has a radially graduated transparent peripheral edge region 46. Two small optical gratings 47 and 48 are arranged at fixed positions facing respective portions of the edge region 46. Each of the gratings 47 and 48 has a line spacing equal to that of the graduation on the edge region 46 of the disc 43. The relative arrangement of the gratings 47 and 48 is such that the variations in light transmitted through the edge region 46 and the grating 48 as the disc 43 rotates in the direction for forward movement of the film 11 leads by 90° in phase the variation in light transmitted through the edge region 46 and the grating 47 from the source 44 to the diode 45. Correspondingly, the variation transmitted through the grating 48 lags 90° behind the variation transmitted by the grating 47 for reverse movement of the film 11. The source and photodetecting diode for the grating 48 are not shown. A further source and photodetecting diode (not shown) are provided at opposite sides of the disc 43 to provide a pulse each time a transparent window 49 in the disc 43 passes them. Thus the signals A, B and REF are produced as the disc 43 rotates by the respective light sensors cooperating with the gratings 47 and 48 and the window 49.

The edge region 46 of the disc 43 is divided into 1080 transparent segments by its graduation, and 1/12 of a rotation of the twelve tooth sprocket 31 corresponds to the movement of the film 11 by which one film frame is replaced by another at any given position. Hence each such movement of the film 11 in the forward direction results in the generation of 90 pulses in the B signal and a 90° delayed train of 90 pulses in the A signal. Furthermore, one pulse of the REF signals is produced for every 12 frames movement of the film 11.

It is arranged that the leading edge of each REF pulse occurs at the time when the top line of a film frame picture is at a reference position in the gate 34.

Figure 6:
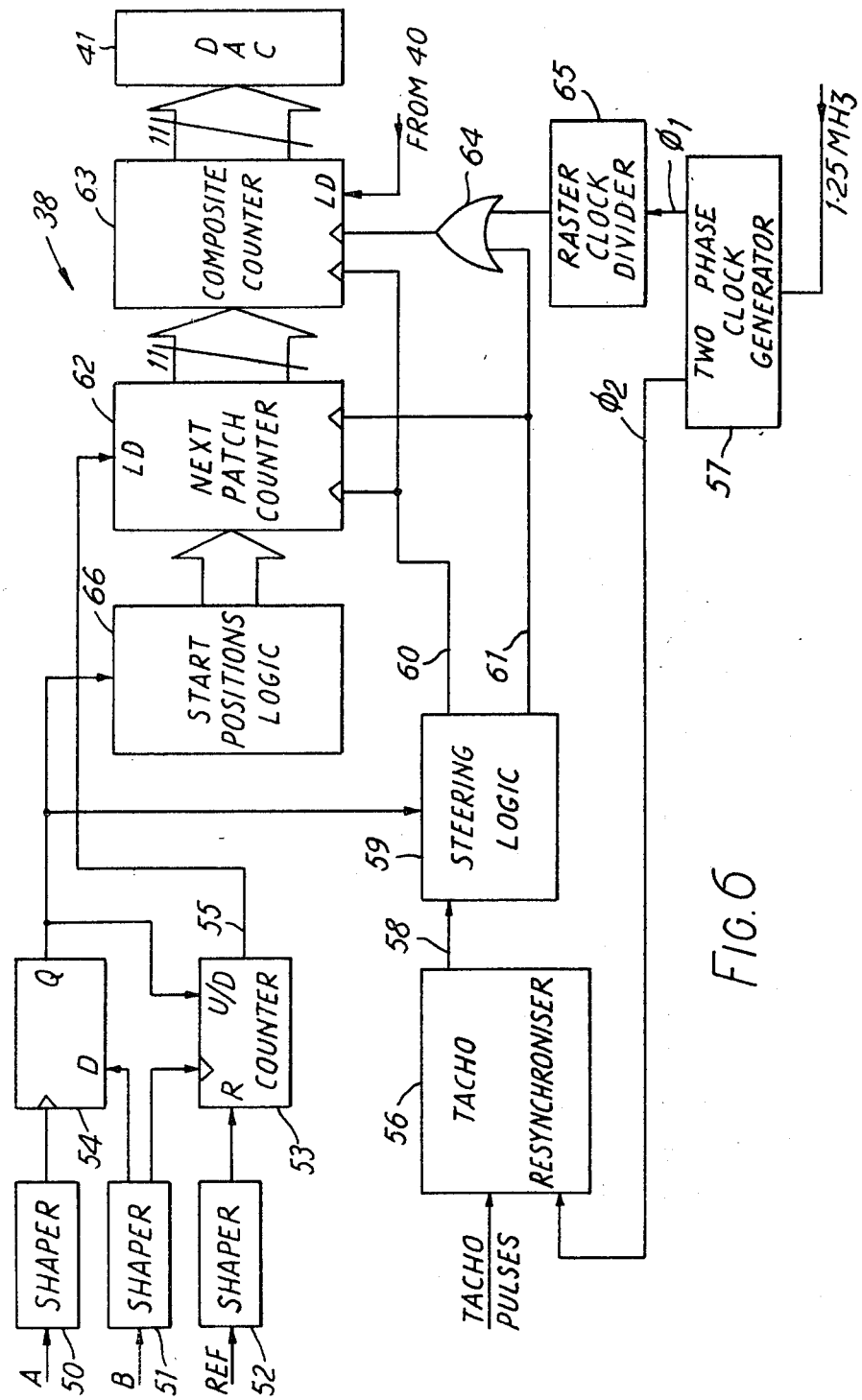
FIG. 6 is a more detailed block diagram of signal processing and generating parts of the embodiment of FIG. 3, FIGS. 7 to 12 are diagrams of integrated circuit units and logic circuitry elements of parts of the embodiment of FIG. 3.

FIG. 6 shows the sprocket encoder 37 mounted on a panel 110 of a flying spot scanner incorporating the present embodiment of the invention. The encoder 37 has a body 111 within which the disc 43 of FIG. 4 is rotatably mounted by a shaft which extends out of the body 111 and has the sprocket 31 fixedly mounted thereon outside the body 111. A circular aperture 113 is provided in the panel 110 to allow installation of the sprocket 31 in its position in the film transport as indicated in FIG. 3. The body 111 of the encoder 37 has a diametrically opposite pair of threaded holes in which respective screws 114 and 115 are engaged, each screw extending through a respective arcuate slot 116 or 117 provided in the panel 110 and centred on the centre of the aperture 113. The optical gratings 47 and 48 shown in FIG. 4 are fixedly mounted to the interior of the body 111 of the encoder 37, together with the respective light sources and photodetecting diodes. The light source and photodetecting diode for the window 49 of the disc 43 are also fixedly mounted to the interior of the encoder body 111. Power lines for the three light sources and output lines for the signals A,B and REF are provided by a cable 112 coupled into the encoder 37.

Since the angular position of the window 49 is fixed relative to the angular positions of the twelve teeth of the sprocket 31, the position of the window 49 in its circular path relative to the panel 110 is representative of the positions of these teeth. By suitable positioning of the light source and photodetecting diode for sensing the window 49, the leading edge of the signal REF can be arranged to occur whenever one film frame in twelve has reached a chosen position, serving as a reference position, in the film scanning region of the film gate 34 of FIG. 3. To allow this detection of the reference position, the head of each of the screws 114 and 115, which is larger than the width of the respective arcuate slot 116 or 117 is arranged to be accessible from the side of the panel 110 remote from the encoder 37. Then, before the screws 114 and 115 are finally tightened to clamp the body 111 of the encoder 37 in a fixed orientation against the panel 110, the body 111 is turned about its axis, which coincides with the axis of rotation of the disc 43 until sensing of the reference position is achieved. The screws are then finally tightened. The arcuate slots 116 and 117 allow the body 111 to be turned through a maximum of slightly more than one twelfth of a revolution.

Sensing of the reference position is carried out by running a film through the film transport and displaying the picture signal generated by the film scanner on a television monitor screen. Unless the encoder body 111 is correctly oriented to sense the occurrence of the reference position, the picture displayed includes part of the gap between pictures in the film. The encoder body 111 is simply turned until the picture displayed is only the pictorial part of the film intended to be seen. When this is achieved, the encoder 37 is sensing the reference position and its body 111 can be fixed against the panel 110.

The light opening (not shown) of the film gate 34 of FIG. 3 is of sufficient extent parallel to the path of the film for slightly more than three complete film frames to be present in this opening. Hence when one film frame reaches the reference position, two other film frames are at respective further reference positions in the scanning region. Referring to FIGS. 1 and 2, it will be seen that the first line of the first screen of a film picture is at the position indicated by the broken horizontal line 16 in FIG. 1 for forward film movement at the position indicated by the broken horizontal line 23 in FIG. 2 for reverse film movement. These positions 16 and 23 are not reference positions since they are determined by the occurrence of television field sync pulses, but are slightly displaced from respective reference positions for the top line 14 of the picture of the frame being scanned. It will be seen that the reference positions for forward and reverse film motions are different and in fact they correspond to respective, simultaneously occurring positions of the respective top picture lines 14 of two different ones of the three film frames within the scanning region defined by the film gate 34.

On referring to FIG. 6, it will be seen that the vertical signal generator 38 is shown in more detail. The three signals, A, B and REF from the sprocket encoder 37 are supplied to respective shaper circuits 50, 51 and 52. The shaper 51 produces a short pulses of about three microseconds in response to each leading edge in the signal B and supplies the resulting train of pulse to the clock input of a divide by 90 counter 53. The shaper 51 also produces a square wave corresponding to the signal B and supplies this square wave to the D input of a bistable 54. The shaper 50 produces a short pulse of about 3 microseconds in response to each leading edge in the signal A and supplies the resulting train of short pulses to the clock input of bistable 54. The Q output of the bistable 54 is connected to an up/down input terminal of the counter 53. The shaper 52 produces a short pulse of about 3 microseconds in response to each leading edge in the signal REF and supplies the resulting train of short pulses to the reset input terminal of the counter 53. The circuitry of the three shapers 50, 51 and 52 can be any suitable pulse shaping circuitry utilizing for example, transistors and monostable circuits as required and such circuitry, being well known to those skilled in the art, will not be described in further detail herein. Because of the 90° phase difference between the signals A and B, the bistable 54 operates to produce at its output Q a signal which is high or low depending on and therefore representative of the direction of movement of a film engaging the sprocket 31. Thus the direction of counting of the divide by 90 counter 53 is determined in accordance with the direction of film movement. The short pulses produced by the shaper 52 are indicative of the arrival of the first line of a film frame picture at a reference position in the scanning region defined by the film gate 34. However, these pulses occur only once every 12 film frames. The shaper 51, since it is supplied with the signal B, produces 90 pulses per passage of a film frame and accordingly the counter 52, by dividing by 90, produces at its output 55 one pulse per passage of a film frame. Since the counter 53 is reset every 12 film frames, i.e. every 1,080 pulses from the shaper 51, by the pulse from the shaper 52, the output pulses appearing at the output 55 of the counter 53 each occur at the time of arrival of the first line of a film frame at a reference position in the scanning region of the film gate 34. Thus the counter 53 produces a signal representative of the arrival of a predetermined point along the length of each film frame at a reference point in the film scanning region.

The counter 53 can be implemented in any suitable way which provides division by 90 and bi-directional counting controllable by a logic signal at an up/down input terminal. Such circuitry need not be described in further detail herein. It will be seen that the direction of counting of the counter 53 is determined by the Q output of the bistable 54 and hence by the direction of film movement. This allows the direction of the film to be reversed without the reversal resulting in spurious outputs from the divide by 90 counter 53.

The tacho pulses produced by the tachometer 36' are supplied to a tach resynchronizer 56 which also receives one phase $\phi_2$ of clock pulses produced by a two phase generator 57 driven by the 1.25 megahertz output of the crystal controlled sync and clock pulse generator 40. The $\phi_2$ pulses have a repetition rate of 625 kilohertz and the tacho resynchronizer 56 produces at its output 58 one $\phi_2$ clock pulse per tacho pulse, each such selected $\phi_2$ clock pulse occurring in the period of the tacho pulse train corresponding to the respective tacho pulse. Each $\phi_2$ clock pulse has a duration equal to half the periodic time of the 1.25 megahertz signal, i.e. 0.4 microseconds. The pulses at the output 58 of the tacho resynchronizer 56, because they correspond to the tacho pulses, are representative of the rate of movement of film in the film transport and are supplied to a steering logic unit 59. The steering logic unit 59 has two outputs 60 and 61 and the pulses supplied by the output 58 of the tacho resynchroniser 56 appear either at the output 60 or at the output 61 of the steering logic unit depending upon the logic state of the Q output signal of the bistable 54, the Q output being connected as shown to the steering logic unit 59. The output 60 of the steering logic 59 is connected directly to the up clock inputs of a next patch counter 62 and a composite counter 63 respectively. The output 61 of the steering logic 59 is connected directly to the down clock input of the next patch counter 62 and through an OR gate 64 to the down clock input of the composite counter 63. A second input of the OR gate 64, and hence the down clock input of the composite counter 63, is supplied with a raster reference rate signal by a raster clock divider 65 which is driven by the other phase $\phi_1$ produced by the two phase clock generator 57. The phase $\phi_1$ consists of pulses having the same duration as the pulses of the phase $\phi_2$ but occurring midway between the times of occurrence of adjacent pulses of the phase $\phi_2$.

Because the steering logic unit 59 is controlled by the Q output of the bistable 54, the direction in which the pulses representative of rate of film movement are counted in the next patch counter 62 and the composite counter 63 is determined by the direction of film movement. The output 60 of the steering logic unit 59 corresponds to the direction for forward film movement, and the output 61 corresponds to a direction for reverse film movement, the direction of counting in the composite counter 63 for reverse film movement being the same as the direction of counting of the raster reference rate pulses from the raster clock divider 65. The repetition rate of the raster reference rate signal is representative of the rate of increase of the vertical co-ordinate of a scaling raster of the dimensions required for scanning film frame when the film is stationary. The rate actually chosen for the raster reference rate signal is determined by the effective gain of the combination of the composite counter 63, the digital to analog converter 41 to which it is connected and the vertical deflection circuitry 42, and by the required resolution.

The output 55 of the counter 53 is connected to the next patch counter 62 to supply the signals representative of arrival of the predetermined point on each film frame at the reference point in the film scanning region as a resetting signal to the next patch counter 62, the output 55 being coupled to the load input of the counter 62. By connection to a start positions logic 66, the next patch counter 62 is reset to a selected one of two predetermined counts, the selection of the predetermined count being determined by the logic state of the Q output signal of the bistable 54 which is supplied to the start positions logic 56 as shown. Thus the selection of the predetermined count for the next patch counter 62 is effected in accordance with the direction of movement of the film. Thus it is arranged, by operation of the start positions logic 66 and the steering logic unit 59 that the next patch counter 62 counts up from one predetermined count when the film is moving in one direction, and counts down from another predetermined count when the film is moving in the other direction. The value of the count in the next patch counter 62 is decoded as an 11-bit output which is made available for sampling by the composite counter 63 as will now be described. The composite counter 63 is arranged to assume the value prevailing of the count in the next patch counter 62 whenever the composite counter 63 is reset. The composite counter 63 is reset each time that a start signal indicative of a time at which a scanning raster is to be initiated is supplied to the load input terminal of the composite counter 63. The crystal controlled sync and clock pulse generator 40, shown in FIG. 3, serves as a means for supplying the start signals, the start signals being television field sync pulses and the composite counter 63 being reset at the leading edge of each field sync pulse.

Since in operation the clock pulses supplied to the next patch counter 62 are representative of the tacho pulses, the count in the next patch counter 62 tracks each length of film that moves past the capstan 32 during the interval between two successive resettings of the counter 62. Assuming that the length of film between successive sprocket holes is the same throughout the portion of film between the sprocket 31 and the capstan 32, the count in the next patch position counter 62 effectively tracks the position of each top line of each film frame picture as this line moves from the reference position in the film gate 34 to the position it reaches by the time that the top line for the next film frame picture arrives at this reference position. The value of the count in the next patch counter 62 appears as an 11-bit output signal and is supplied as a loadable input to the composite counter 63. Each time that the composite counter 63 receives a resetting signal from the pulse generator 40, the count in the composite counter 63 is set to whatever value is presented to it by the next patch counter 62 at that time. This ensures that the count in the composite counter 63 is always loaded at the beginning of each television field to a number representing the current position of the top line of the film frame picture to be scanned.

During forward film movement, the composite counter 63 receives clock pulses from the output 60 of the steering logic unit 59 and raster reference rate pulses from the OR gate 64 and consequently counts these two sets of clock pulses in different directions. It is arranged that when the film is moving at 25 frames per second this counting in opposite directions gives a net count corresponding to the vertical deflection required in the situation represented by FIG. 1. The jump represented in FIG. 1 by the arrow 20 is represented in the composite counter 63 by the change in count which occurs when an 11-bit output signal from the next patch counter 62 is loaded into the composite counter 63.

During reverse movement of the film at 25 frames per second, the composite counter 63 receives the clock pulses provided on the output 61 of the steering logic unit 59 and the raster reference rate pulses through the OR gate 64 so that the counting of these two sets of pulses is effected in the same direction in the composite counter 63.

The count in the composite counter 63 is taken to values which correspond to positions slightly beyond those representing positions of the required raster in FIGS. 1 and 2 to avoid the need to interrupt the supplying of clock pulses to the composite counter 63. Blanking of the beam of the cathode ray tube (not shown) which displays the raster ensures that the additional count values do not result in extension of the rasters beyond the required positions.

The output from the composite counter 63 to the digital to analogue converter 41 is again an 11-bit digital decoding of the count in the counter 63.

Details of the circuitry of FIG. 6 will now be described in more detail with reference to FIGS. 7 to 12.

Figure 7:
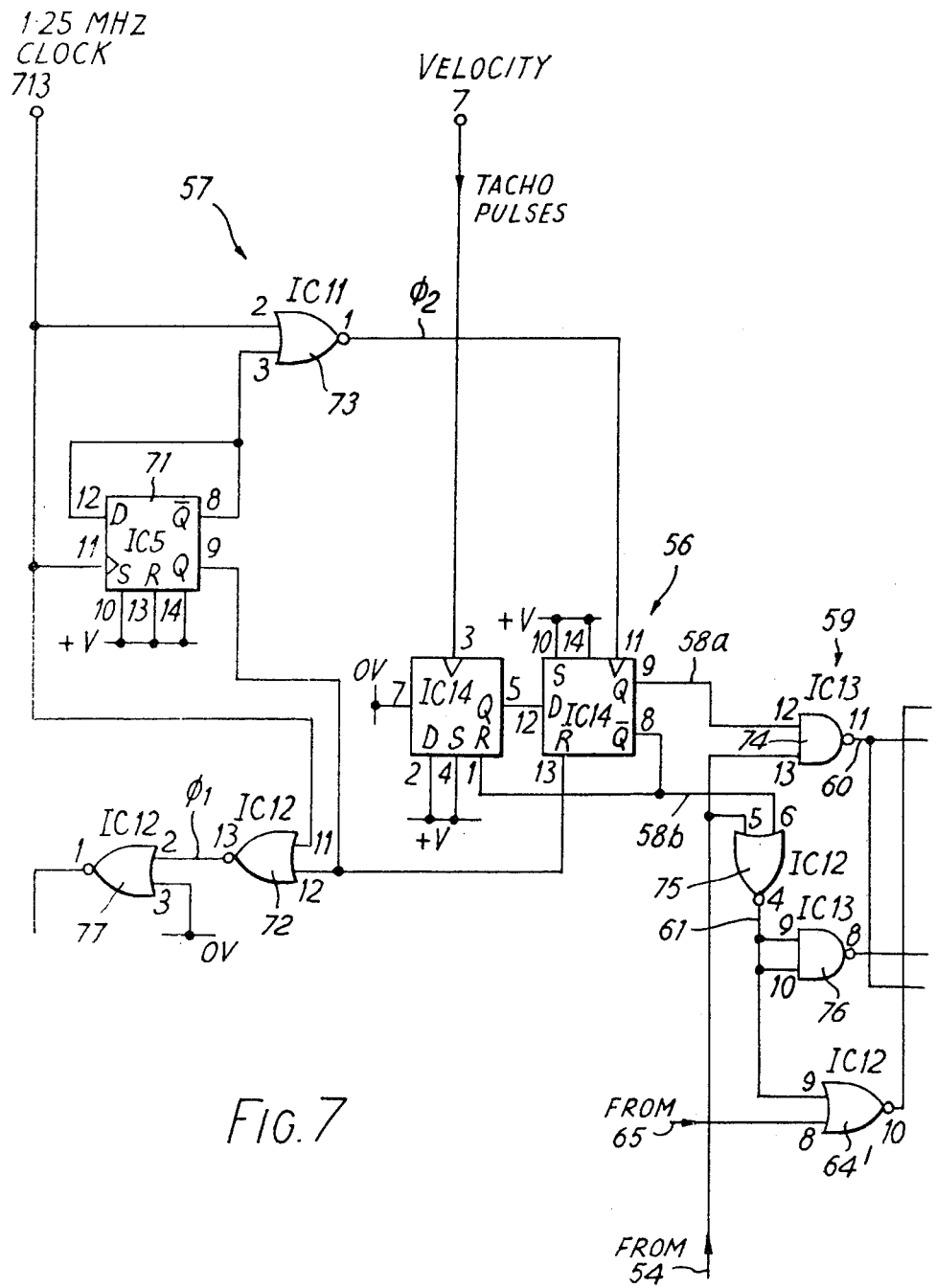

FIG. 7 shows the tacho resynchroniser 56, the two phase clock generator 57, the steering logic 59 and a NOR gate 64' which is used in practice instead of the OR gate 64 of FIG. 6. The crystal controlled sync and clock pulse generator 40 of FIG. 3 supplies the 1.25 megahertz signal to the input terminal 713 of the two phase clock generator 57 which consists of a bistable circuit 71 and two NOR gates 72 and 73 at the output terminal of which respectively appear the $\phi_1$ clock signal and the $\phi_2$ clock signal. The 1.25 megahertz pulses are supplied to the clock input terminal of the bistable 71 which is half of an integrated circuit IC5 of a type 74 LS 74. The bistable 71 is connected as a divide by two circuit and has its Q output connected to one input of the NOR gate 72 and its $\bar{Q}$ output connected to one input of the NOR gate 73. The respective other inputs of the two NOR gates 72 and 73 are connected to the input terminal 713 for the 1.25 megahertz signal. The tacho pulses are supplied to an input terminal 7 designated VELOCITY in FIG. 7. The input terminal 7 is connected to the signal input of a latching circuit constituting the resynchroniser 56 and formed by an integrated circuit IC 14 which is of the type 74 LS 74. The signal input of the latching circuit is the clock input pin 3 of one of the bistable circuits of IC 14. The Q output of this bistable circuit is connected to the D input of the other bistable circuit of IC 14, the clock input pin 11 of which is connected to the output of the NOR gate 73 and therefore receives the $\phi_2$ clock signal. Other pins of the integrated circuit IC 14 are connected as shown. The tacho resynchroniser 56 provides two output streams of pulses which are connected by conductors 58a and 58b respectively to a NAND gate 74 and a NOR gate 75 which are parts of the steering logic unit 59. Respective second inputs of the gates 74 and 75 are connected to the Q output of the bistable 54 of FIG. 6. Thus when the bistable 54 provides at its Q output a logic 1 signal, the gate 74 is open and the gate 75 is closed, and when the Q output of the bistable 54 provides a logic 0 signal, the gate 74 is closed and the gate 75 is open. Two further gates 76 and 77 are shown in FIG. 7 which are used as inverters as required by the particular practical circumstances.

Figure 8:
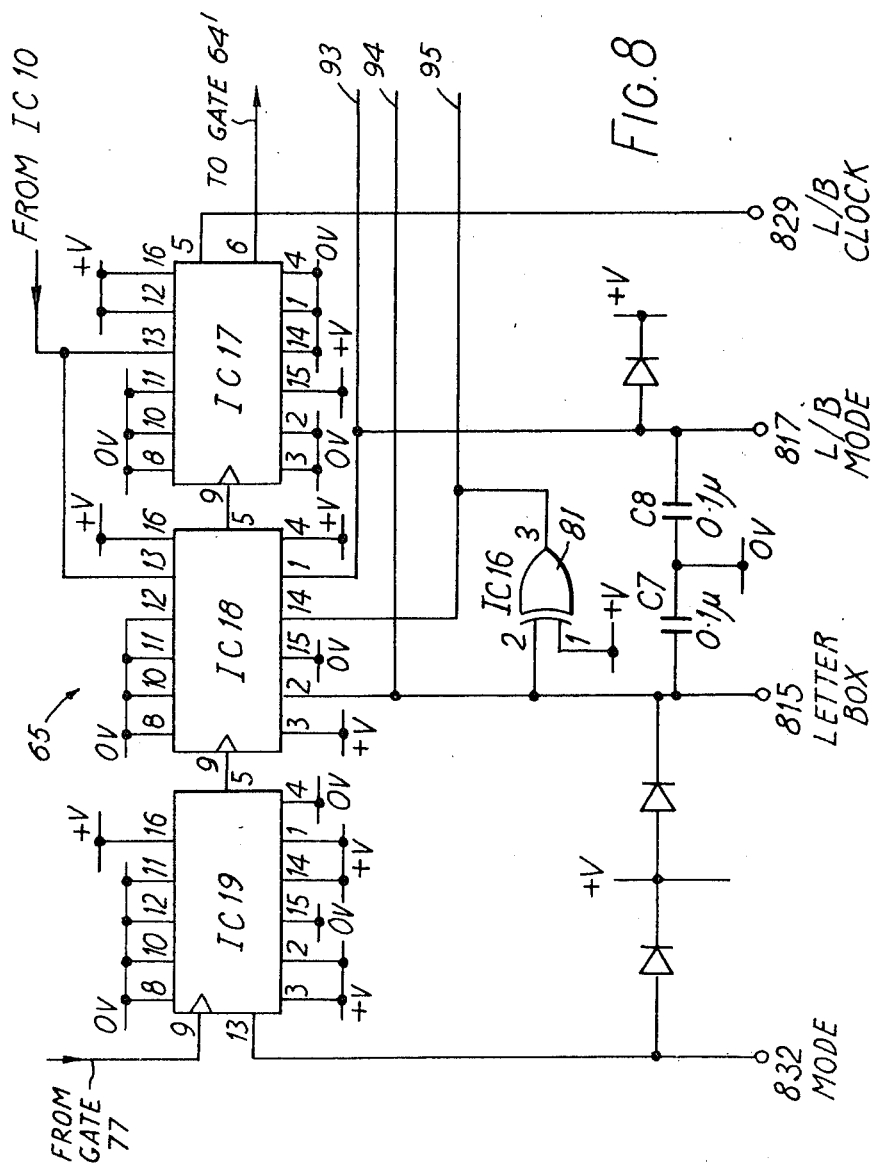

The output of the gate 77 is connected to the clock input pin 9 of a first binary rate multiplier in the form of an integrated circuit IC 19 shown in FIG. 8. Two further binary rate multipliers which are integrated circuits IC 18 and IC 17 are connected in cascade to the output of the binary rate multiplier IC 19 as shown. The three binary rate multipliers IC 17, IC 18 and IC 19 constitute the raster clock divider 65 of FIG. 6, and are each an integrated circuit of the type 7497. Logic signals are supplied to four input terminals 832, 815, 817 and 829 designated respectively MODE, LETTERBOX, L/B MODE and L/B CLOCK in FIG. 8. The logic signal applied to the mode input terminal 832 is logic 0 for PAL scanning with 625 lines per complete television picture, and logic 1 for NTSC scanning with 525 lines per complete television picture. The LETTERBOX input terminal 815 receives a logic 0 signal for scanning film which is normal as regards its aspect ratio and a logic 1 signal for an expanded scan for scanning an anamorphic film such as cinemascope. The L/B MODE input terminal 817 receives a logic 0 signal for normal aspect ratio film and a logic 0 signal for a slight change of aspect ratio which may be necessary for certain films. The L/B CLOCK input terminal 829 receives a pulsed signal which effects blanking of the video signal at the times of the top and bottom of the television picture to effect blanking of between 7 to 30 lines. The sources of the signals for the input terminals 832, 815 and 817 are manually operated switches are not shown. The source of the intermitent signal for the input terminal 829 is a simple circuit driven by the crystal controlled sync and clock pulse generator 40 and need not be described. The output pin 6 of the final cascaded binary rate multiplier IC 17 is connected to one input of the gate 64' of FIG. 7. Pins 13 of IC 17 and IC 18 both receive a reset pulse at the beginning of each field period from a monostable circuit IC 10 driven by the field sync pulses. This ensures that the pulses generated by the raster clock device 65 are synchronous with pulses supplied to the reset input LD of the composite counter 63 as shown in FIG. 6.

Figure 9:
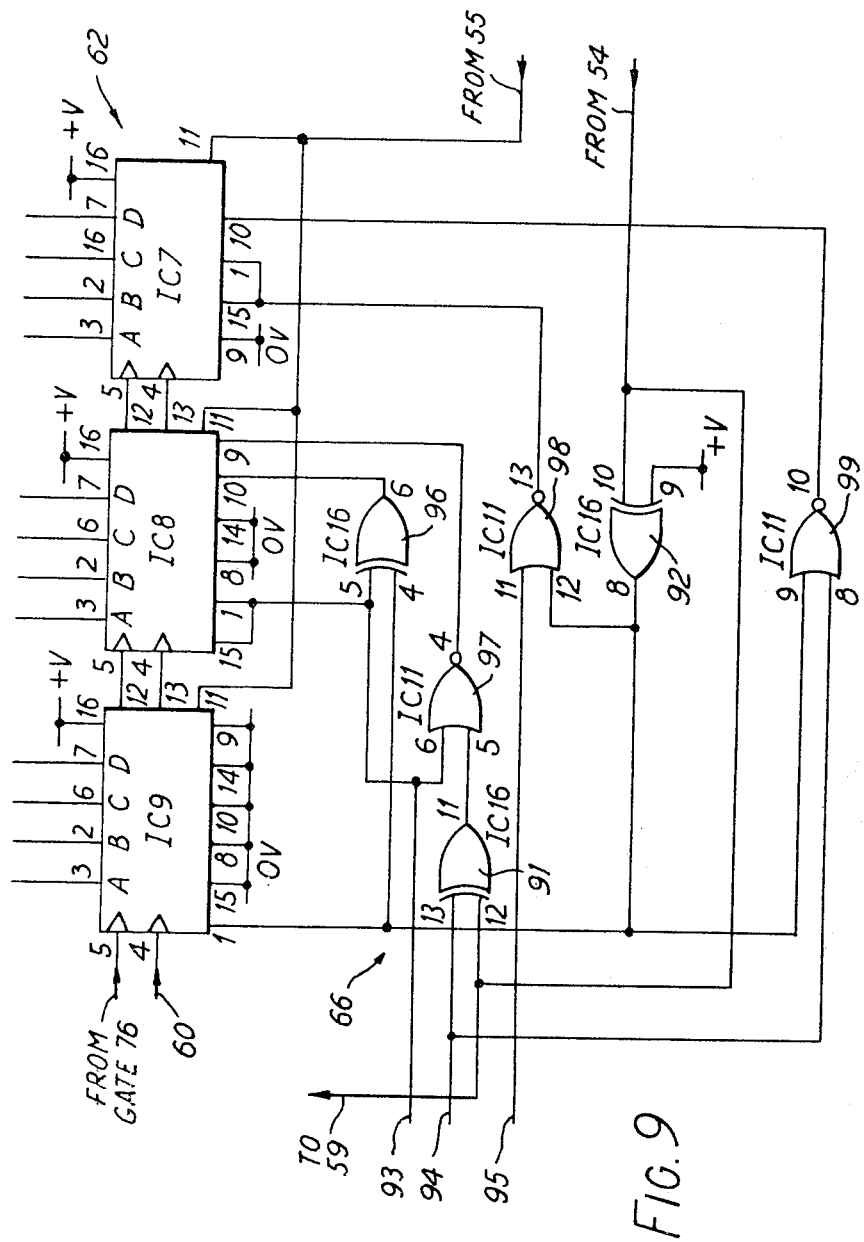

FIG. 9 shows the next patch counter 62 and the start positions logic 66. The next patch counter 62 consists of three integrated circuits counters IC 9, IC 8 and IC 7 connected in cascade as shown and each having two clock input pins 4 and 5, clock pulses supplied to the pin 4 being counted down, and clock pulses supplied to the pin 5 being counted up. Each of the integrated circuit counters IC 7, IC 8 and IC 9 is a type 74 LS 193, and has four count value output pins 3, 2, 6 and 7 designated A, B, C and D in FIG. 9. Pins 4 and 5 of IC 9 are connected respectively to the outputs of gates 74 and 76 of FIG. 7. The count values to which the counter 62 resets are determined by logic signals supplied to pins 1, 15, 8, 10, 14 and 9 of IC 9 and IC 8 and to pins 9, 15, 1 and 10 of IC 7. Each of the three integrated circuits forming the counter 62 has a load or reset input pin 11 which during running of a film is connected through a switch SS1 shown in FIG. 11 to an input terminal 211 which is connected to the output 55 of the counter 53 in FIG. 6.

Figure 10:
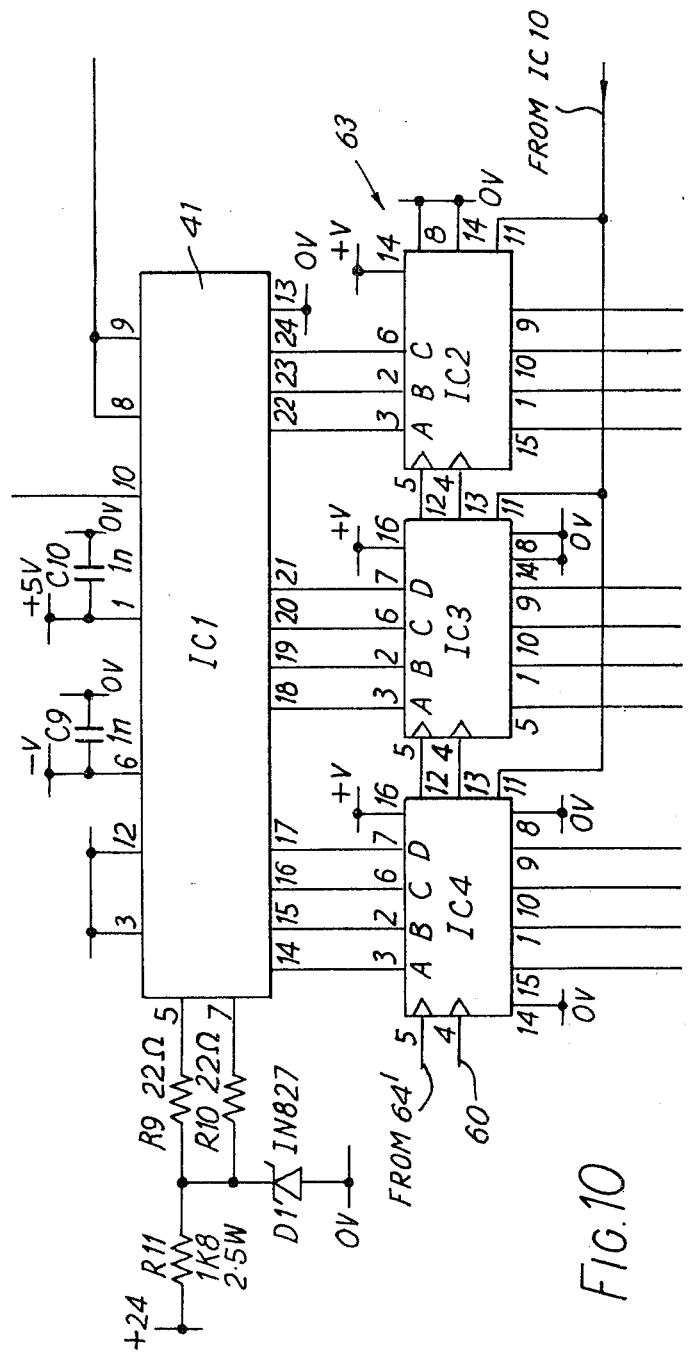
Figure 11:
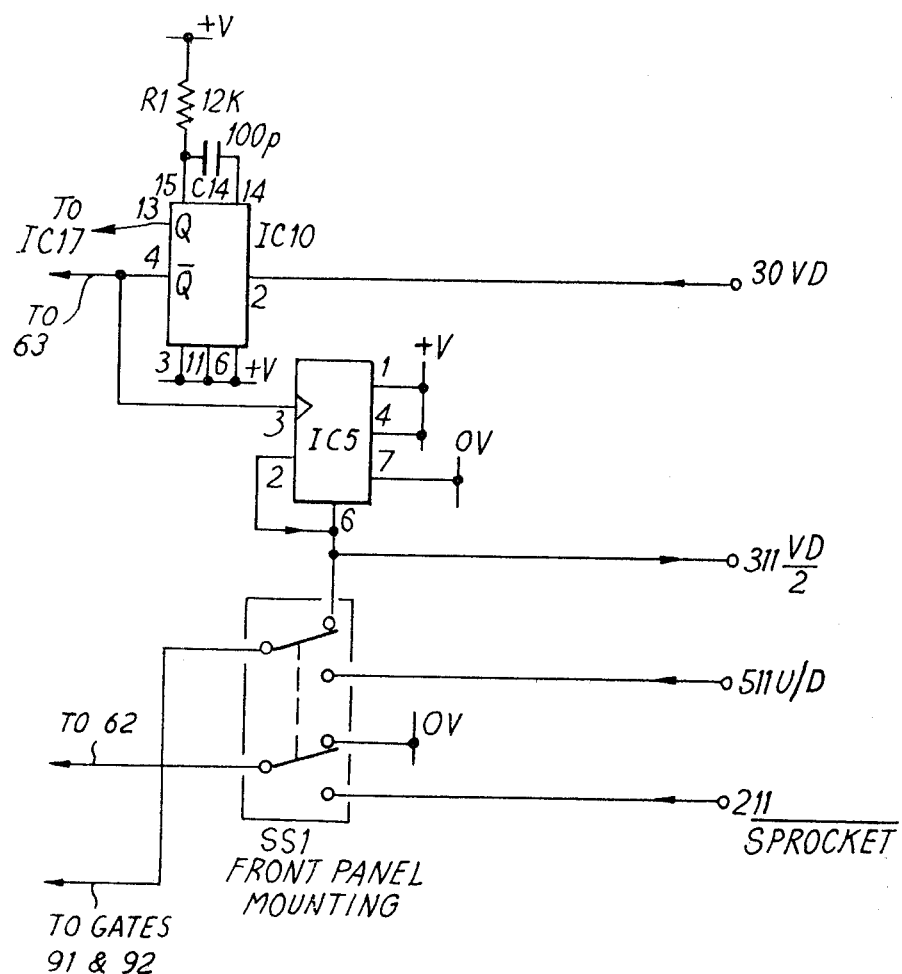

The start positions logic 66 includes two exclusive-OR gates 91 and 92 which have inputs connected to the Q output of the bistable 54 of FIG. 6. Three further inputs 93, 94 and 95 are connected to the terminal 817, 815 and an exclusive-OR gate 81 respectively in FIG. 8. The gate 81 couples the input 95 as shown to the input terminal 815 in FIG. 8. Thus provision is made in the start positions logic 66 for small differences in starting positions as required by different types of film and aspect ratio. The exclusive-OR gates 81 and 92 in FIGS. 8 and 9 respectively act simply as inverters and are included on an integrated circuit IC 16 which includes the gate 91 and a further exclusive-OR gate 96 which couples pin 10 of IC 8 to the input 93 or to the gate 92 exclusively. The input 93 and the gate 91 are connected to respective inputs of a NOR gate 97 the output of which is connected pin 9 of IC 8. A further NOR gate 98 couples the input 95 and the gate 92 to pins 1 and 15 of IC 7. Respective inputs of the gate 91 and 92 are normally connected to the Q output of the bistable 54 of FIG. 6 through the switch SS1 of FIG. 11 at a terminal 511 designated U/D in FIG. 11. Switch SS 1 of FIG. 11 is a ganged pair of single pole two way switches and is shown in FIG. 11 in a test condition in which 0 volts are supplied to the reset pins 11 of the counter 62 and pulses at half the field sync pulse rate are supplied to the gates 91 and 92. With a stationary film in the film gate 34, the test position of switch SS 1 enables minor adjustments to be carried out by comparing on a television monitor screen the effect of switching between adjacent film frame pictures at half field sync pulse rate. In FIG. 11, field sync pulses generated by the crystal controlled sync and clock pulse generator 40 of FIG. 3 are supplied to an input terminal 30 VD connected to a monostable circuit IC 10 of the type 74 LS 221 which has its $\bar{Q}$ output connected to a divide by two bistable IC 5 which produces the pulses at half field sync pulse rate to be supplied to the switch SS 1 and to an output terminal 311. The divide by two bistable IC 5 of FIG. 11 is the other half of the integrated circuit IC 5 shown in FIG. 7. The Q output of the monostable IC 10 is connected to the respective pins 13 of the binary rate multipliers IC 17 and IC 18 of FIG. 8 as described hereinbefore. The $\bar{Q}$ output of the monostable IC 10 is also connected to the load or reset pins 11 of three integrated circuit counters IC 2, IC 3 and IC 4 which constitute the composite counter 63 as shown in FIG. 10. The three integrated circuit counters IC 2, IC 3 and IC 4 are each on the same type 74 LS 193 as the three integrated circuit counters of the next patch counter 62 and accordingly have clock input pins 4 for counting down and clock input pins 5 for counting up. The three integrated circuit counters of the composite counter 63 are connected in cascade as shown and are adapted to reset to the count values of the three respective integrated circuit counters of the next patch counter 62 by being connected as follows. Counter IC 2 is connected to counter IC 7, counter IC 3 is connected to counter IC 8, and counter IC 4 is connected to counter IC 9. In each case pins 15, 1, 10 and 9 of the integrated circuit counter of the composite counter 63 are connected respectively to pins 3, 2, 6 and 7 of the respective integrated circuit counter of the next patch counter 62. The up clock input pin 5 of the counter IC 4 is connected to the output of the NOR gate 64', and therefore can receive pulses corresponding either to the pulses generated by the raster clock divider 65 or pulses appearing at the output 61 of gate 75 of the logic steering unit 59. The down clock pin 4 of the counter IC 4 is connected to the output 60 of the gate 74 of the steering logic unit 59 and accordingly receives pulses from this single source only. The digital to analog converter 41 is an integrated circuit IC 1 of the type BAC 562. The count value output pins 3, 2, 6 and 7 of IC 4 and IC 3 of the composite counter 63 are connected respectively to input pins of the digital to analog converter 41, and the first three count value output pins 3, 2 and 6 of IC 2 of the composite counter 63 are connected to three further respective input pins of the digital to analog converter 41 as shown. Other circuitry, including a zener diode D1 of the type IN827 are connected to IC 1 as required for operation of this integrated circuit.

Figure 12:
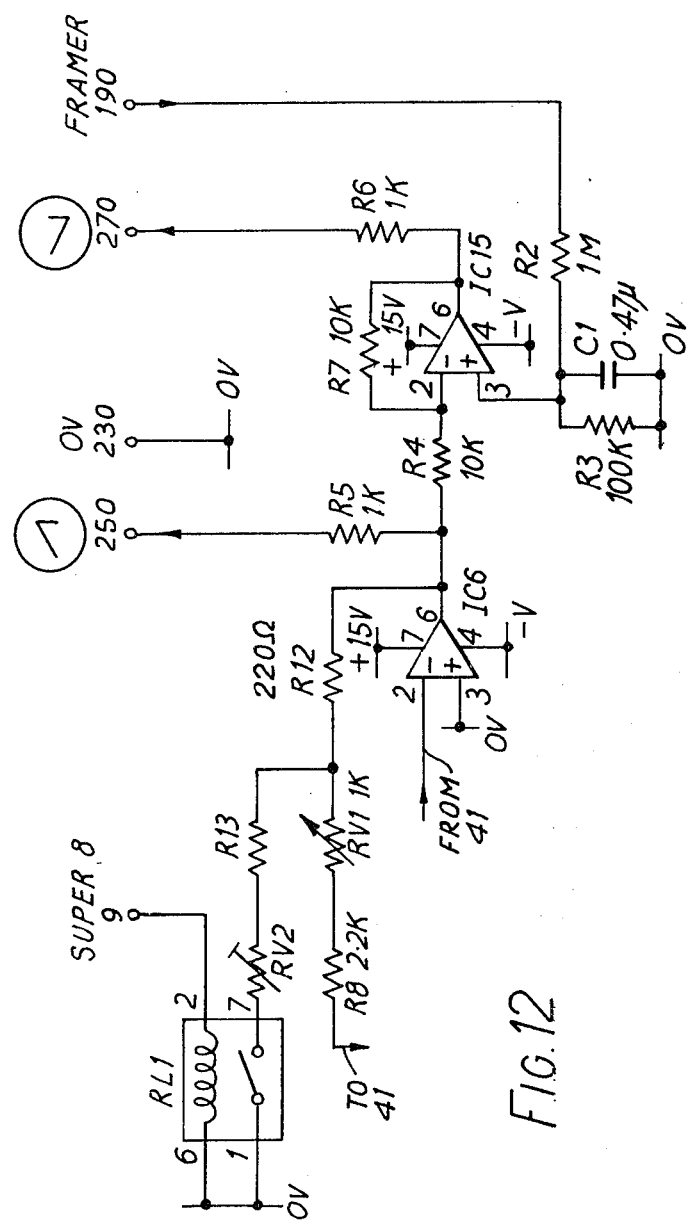

The output pins 8 and 9 of the integrated circuit IC 1 are connected to the negative input of a first operational amplifier IC 6 shown in FIG. 12, which is of the type LF 356. The output of the operational amplifier IC 6 is coupled through three series resistors R12, RV1 and R8 to a negative feedback input pin 10 of the digital to analog converter IC 1. The negative feedback to pin 10 of IC 1 provides stabilisation and determines the gain of the digital to analog converter in combination with the operational amplifier IC 6. To enable the apparatus to be used with super 8 film, the gain of this combination can be altered to a suitable value by closure of a normally open relay switch of a relay RL 1 arranged to switch in a series combination of a fixed resistor R13 and a variable resistor RV2 as shown by the connections in FIG. 12. Operation of the relay RL1 is controlled by a signal applied to an input terminal 9 designated in FIG. 12 as SUPER 8. The output of the first operational amplifier IC 6 is coupled through a differential amplifier arrangement incorporating a further integrated circuit operational amplifier IC 15 of the type LF 356 for supplying an inverted form of the analog output signal. The positive gain input of the second operational amplifier IC 15 is coupled to an input terminal 190 designated FRAMER in FIG. 12 for any further signal which may be required to position or modify for special purposes the output signal produced at an output terminal 270 by the differential amplifier arrangement of IC 15. The un-inverted analog output signal produced by the first operational amplifier IC 6 is coupled through a fixed resistor R5 to an output terminal 250. A reference output terminal 230 at zero volts is also provided, the three output terminals 230, 250 and 270 being connected to further deflection circuitry which with the circuitry of FIG. 12 makes up a vertical deflection circuitry 42 of FIG. 3.

The integrated circuits IC 11, IC 12, IC 13 and IC 16 which provide the various gates shown in FIGS. 7, 8 and 9 are TTL circuits and are as follows. IC 11 and IC 12 are both type 74 LS 02, IC 13 is a type 74 LS 00 and IC 16 is a type 74 S86. The diodes shown in FIG. 8 which protect the binary rate multipliers against damaging conditions are type IN 4148.

Pin numbers of the integrated circuits and the values of resistors and capacitors included in the circuitry of FIGS. 7 to 12 are indicated in those figures.

Other units of a flying spot film scanner incorporating the present invention need not be described herein since such units are well known to the man skilled in the art and are also described in detail in the prior art such as the Focal Encyclopedia of Film & Television Techniques at pages 824 to 845, published in 1969 by the Focal Press of London and New York, and Principles of PAL Colour Television and Related Systems by H. V. Simms, at page 139 to 143, published by Iliffe Books Ltd. of London.

Other embodiments of the present invention can be constructed within the scope of the claims appended hereto which define the invention.

I claim:

1. Apparatus for use in scanning a cinematograph film from which a television video signal is to be produced while the film is being moved in a continuous manner, the apparatus comprising:

film transport means for moving cinematograph film in a continuous manner;

means defining a film scanning region;

signal generating means for generating pulses representative of rate of movement of a film in said transport means, and signals representative of direction of movement of said film and arrival of a predetermined point along the length of each film frame at a reference point in said film scanning region;

raster reference rate means for producing a raster reference signal having a repetition rate representative of the rate of increase of the vertical coordinate of a scanning raster of the dimensions required for scanning a frame of a film in the absence of movement of the film;

steering means coupled to said signal generating means to receive therefrom pulses and signals representative respectively of rate and direction of movement of said film;

first up/down counter means having a reset input and two clock inputs one of which when supplied with clock pulses causes said first counter means to count up and the other of which when supplied with clock pulses causes said first counter means to countdown, said signal generating means being coupled to said reset input to supply thereto a resetting signal at each occurrence of the arrival of said predetermined point of a respective film frame at said reference point, and said steering means being coupled to said two clock inputs to supply selectively to one or the other thereof, in dependence on direction of film movement represented by said signal from said signal generating means, pulses representative of rate of film movement, said first counter means being adapted to reset to a count representative of said reference point, whereby in each counting cycle of said first counter means the count therein is representative of the position of said predetermined point of each respective film frame during the time in which said predetermined point moves from said reference point to a position reached when the predetermined point of the next film frame entering said scanning region arrives at said reference point;

second up/down counter means having a reset input and two clock inputs one of which when supplied with clock pulses causes said second counter means to count up and the other of which when supplied with clock pulses causes said second counter means to count down, said raster reference rate means being coupled to said second counter means to supply clock pulses thereto for counting in the direction required for producing count values representative of an increasing vertical coordinate of a scanning raster for scanning a film frame in the absence of movement of the film, and said steering means being coupled to said two clock inputs of said second counter means to supply selectively to one or the other thereof, in dependence on direction of film movement represented by said signal from said signal generating means; raster start means for supplying start signals indicative of times at which a scanning raster is to be initiated, said raster start means being coupled to supply said start signals as resetting signals to said reset input of said second counter means, said second counter means being so coupled to said first counter means at each start signal, whereby the count value in said second counter means is representative of the vertical coordinate of the scanning raster required for scanning a film frame in said scanning region; and converter means coupled to said second counter means to produce an analog signal representative of said count value in said second counter means.

2. Apparatus as claimed in claim 1, wherein said steering means comprises a plurality of logic gates connected to be controlled by a logic signal the state of which is representative of film movement direction, and said signal generating means includes means for producing said signal representative of direction of movement of said film in the form of said logic signal.

3. Apparatus as claimed in claim 2, wherein said steering means comprises two logic gates so controlled by said logic signal that one of said gates is open whenever the other of said gates is closed and vice versa, and one of said gates is coupled to said clock inputs for counting up and the other of said gates is coupled to said clock inputs for counting down.

* * * * *